April 21, 1970     H. H. BRIDGFORD     3,507,668
COMBINATION AUTOMATICALLY OPENING FROZEN
DOUGH RECEPTACLE AND BAKING PAN
Filed Feb. 28, 1969     2 Sheets-Sheet 1

INVENTOR.
HUGH H. BRIDGFORD

BY S. Stephen Baker
ATTORNEY

INVENTOR.
HUGH H. BRIDGFORD
BY
ATTORNEY

United States Patent Office 3,507,668
Patented Apr. 21, 1970

1

3,507,668
COMBINATION AUTOMATICALLY OPENING FROZEN DOUGH RECEPTACLE AND BAKING PAN
Hugh H. Bridgford, 5415 Bergenline Ave., West New York, N.J. 07093
Continuation-in-part of application Ser. No. 754,131, July 25, 1968. This application Feb. 28, 1969, Ser. No. 803,150
Int. Cl. B65b 25/16
U.S. Cl. 99—172                               4 Claims

ABSTRACT OF THE DISCLOSURE

A frozen yeast-containing developed dough fills a box-like, folded receptacle having two rectangular closure panels which have contiguous free edges at the top center of the receptacle, and an outer top end panel at each end of the receptacle, the dough, when permitted to thaw and rise, exerting substantially uniform upward pressure against said closure panels, and through them against said top end panels, so as to automatically cause said panels to unfold and form a baking pan for the dough. Aluminum foil is provided wherever the dough makes contact with the receptacle walls so as to avoid undesired excessive cohesion which might interfere with the dough rising and receptacle unfolding process, and the end edges of the closure panels being cut so as to be inclined and extend inwardly and avoid contact with adjacent panels of the receptacle for further minimizing interference with free rising of the dough.

This application is a continuation-in-part of my prior application Ser. No. 754,131, filed July 25, 1968.

BACKGROUND OF THE INVENTION

The present invention relates generally to an improved device for the production of baked products such as bread, and it relates particularly to an improved receptacle wherein frozen prepared dough is stored, and wherein it may be permitted to thaw and to rise under the combined influence of a warmer environment and of yeast in the prepared dough, and further wherein it may be baked so that the receptacle serves the dough from its frozen, storage state, to its eventual baking, all without removing the dough from the receptacle until it is ready to be cooled, or to be eaten.

As in my above identified prior application, the receptacle or package is originally folded, but it automatically opens under the motive influence of the rising dough when transferred to a warmer atmosphere where the frozen dough is allowed to thaw, the opened receptacle then being capable of being placed in an oven so that the risen dough may be baked for a desired period of time to produce a freshly baked loaf or the like, all without being removed from the storage receptacle. As was pointed out in my prior application, handling or manipulating of the dough is avoided, time is conserved, and no skills of any kind are required.

SUMMARY OF THE INVENTION AND OBJECTS

It is a principal object of the present invention to provide an improved receptacle of the nature above described. Basically, the improved receptacle has a more positive and reliable automatic opening action under the motive influence of the rising dough. This is effected by a novel means of folding the receptacle whereby it has an improved response to the upward pressure of the rising dough and opens so as to simulate and function as a baking pan of dimensions commensurate with the particular mass of the frozen dough. In other words, the receptacle is caused to unfold and provide vertical side walls which are of a height substantially equal to that of the thawed and risen mass of dough so that the finished baked loaf arcuately extends slightly above the receptacle walls as is desirable. My prior application disclosed such a receptacle but the present improved receptacle is more easily, responsively, and reliably opened to the desired extent prior to baking of the risen mass of dough.

Another object of this invention is to so form the receptacle walls that the thawing, plastic dough does not embed the wall edges, which would prevent proper unfolding of the walls.

A further object of this invention is to provide non-fibrous surfaces where the dough contacts the receptacle walls. This is desirable in order to avoid excessive cohesion between the dough and the walls which would likewise prevent proper unfolding of the walls. I accomplish this by providing an aluminum foil coating to the fibrous cardboard structure, and further extending the foil coating over and past the side wall edges in order to insure against the undesired cohesion which might, in fact, lock the walls against unfolding.

The above and other objects of this invention will become apparent from the following description and drawings.

DESCRIPTION OF THE PREFERRED EMBODIMENT

Figure 2:
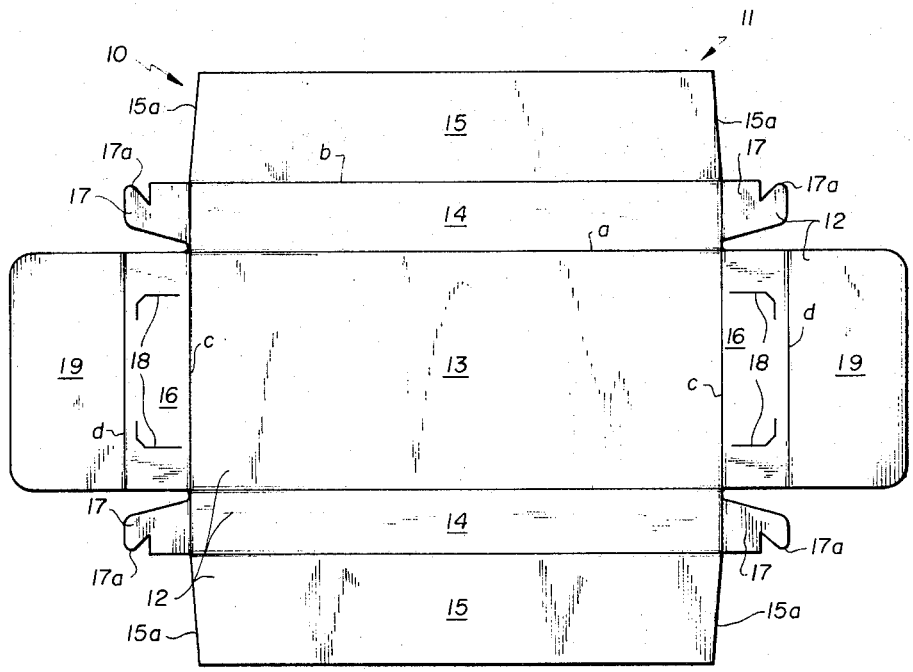
FIGURE 2 is a plan view of the lay flat blank, showing the inside thereof.

Referring now to the drawings which illustrate a preferred embodiment, the reference numeral 10 in FIGURE 2 generally designates the improved storage carton and baking receptacle which is formed from a unitary blank 11. The blank 11 advantageously consists of a cardboard structure coated along the entire inner surface thereof with a layer of aluminum foil 12. For example, the cardboard may be of the solid, bleached sulphate type having a weight of about 203 pounds per ream and the aluminum foil having a thickness of about .0003 inch and a weight of about 12½ pounds ream weight. Of course, these figures are simply representative and may be deviated from considerably.

Figure 3:
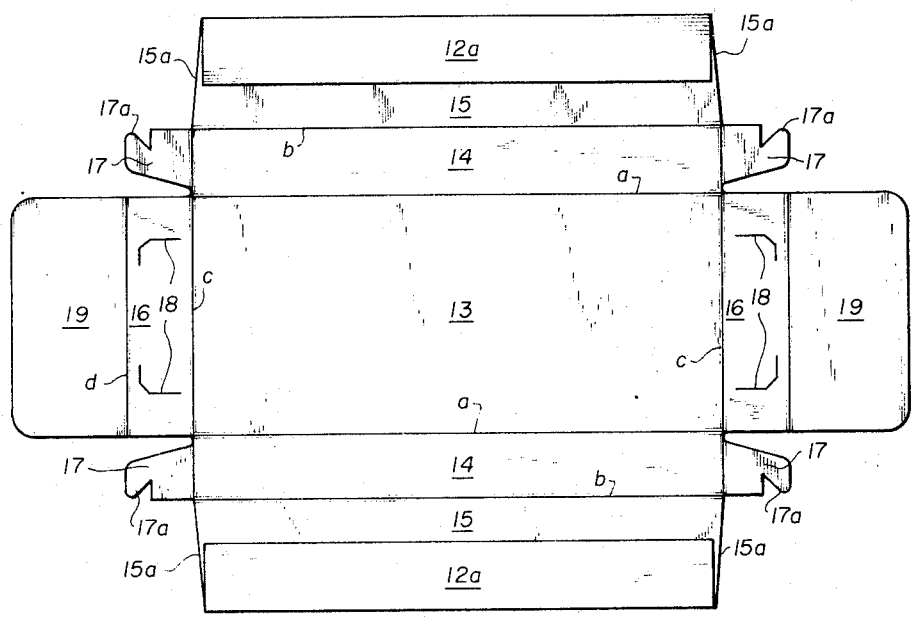
FIGURE 3 is a view similar to FIGURE 2, but showing the outer side of the blank, or of the receptacle which it forms.

As will be described hereinafter, the aluminum foil 12 extends around to the outer side of the blank so as to form outer foil strips 12a as illustrated in FIGURE 3.

Referring again to FIGURE 2, the blank 11 includes the rectangular bottom wall panel 13, along the long edges of which extend shallow front and rear panels 14, delineated from panel 13 by scored, fold lines a. Extending from the outer edges of panels 14, and delineated therefrom by fold lines b, are coextensive front and rear extension and closure wall rectangular panels 15, each having a width about one-half that of bottom panel 13. In addition, rectangular end panels 16 extend from the ends of panel 13 and are delineated therefrom by scored fold lines c. Panels 14 are provided with hooked end tabs 17, and end panels 16 are formed with substantially L-shaped cuts 18 adapted to receive the hooks 17a of tabs 17 as will be hereinafter described, this simple action substantially forming the carton or receptacle from the blank 11.

Extending from end panels 16, and delineated therefrom by scored fold lines d, are rectangular top panels 19 which overlie the outside of panels 15 in the formed carton or receptable as will be hereinafter explained.

In assembling the receptacle 10, it is only necessary to interlock hooks 17a into L-shaped cuts 18 so that side panels 14, and end panels 16 become vertical, forming a box-like structure.

The receptacle is filled to about the upper edges of panels or walls 14 and 16 with a developed yeast dough in an unraised condition, that is in which the gluten in the dough has been developed to its optimum viable state by kneading in the known manner. The yeast-containing dough may be of any conventional composition and prepared in any suitable manner, either by a batch or continuous process. It may be a bread dough or a cake dough and may include any of the usual ingredients and additives. The dough may be singly kneaded or may be successively kneaded with intervening rising periods but it is packaged in the receptacle 10 in its developed, unraised state.

Figure 4:
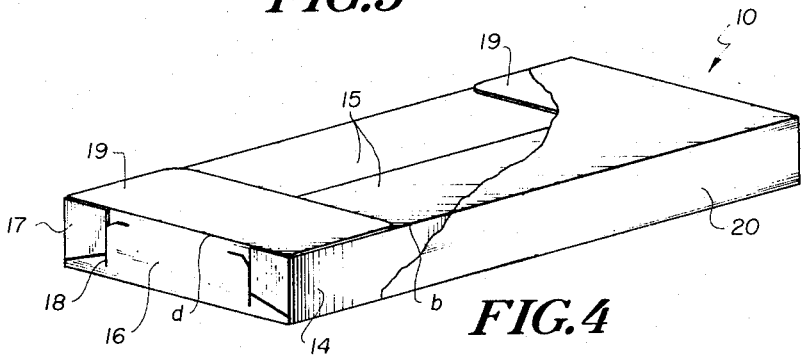
FIGURE 4 is a perspective view of the fully closed receptacle, the dough being frozen and accordingly compacted and the outer removable wrapper being partly broken away.
Figure 5:
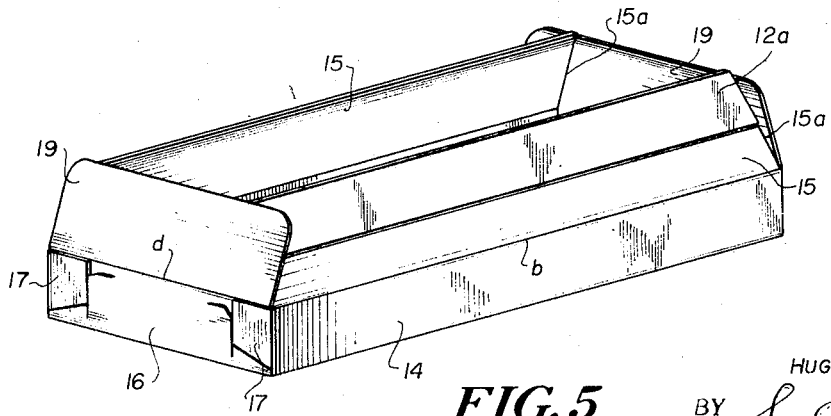
FIGURE 5 is a perspective view of the recptacle in a partially open condition.

The receptacle 10 is then closed by folding the panels or walls 15 to a horizontal position where they enclose the mass of dough, while the end top panels 19 are swung and folded over the outside of panels 15 as shown in FIGURE 4. Panels 19 extend over about one-fifth of panels 15 on each end thereof. In the closed condition the free edges of closure panels 15 are substantially contiguous and confronting each other along their full lengths, such free edges being of course covered by the aluminum foil 12, including the top strips 12a.

The dough-containing closed package is then promptly enclosed in any suitable outer wrapper 20, a printed paper wrapper for example, and is deep frozen. The product is thus storaged at conventional deep freeze temperatures which will deactivate the yeast and prevent any deterioration of the dough.

Figure 1:
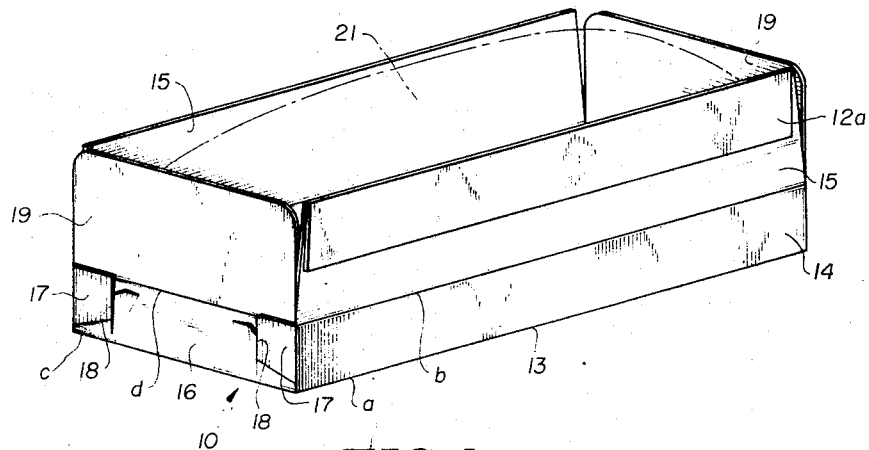
FIGURE 1 is a perspective view of the dough receptacle of this invention, the receptacle being illustrated in an open condition, ready for the baking operation, and the dough shown by broken lines in a thawed and raised state.

In preparing to bake the dough product, the outer wrapper 20 is removed and the dough containing receptacle is stored either at room temperature or at a higher temperature to expedite the action if desired. Thus, it may be deposited in a 200° F. oven for about one hour, under which conditions the yeast activity is almost maximum. In any event, the thawing of the dough mass 21 is accompanied by its rising to the desired volume, for example, as shown by broken lines in FIGURE 1. As the dough 21 rises, it per se presses against and raises the extension walls 15, which further transmits the upward pressure to end top panels 19 so that walls 15 and panels 19 may eventually reach vertical positions to form the box-like receptacle as shown in FIGURE 1, where the top edges of walls 15 and those of end panels 19 are all at the same vertical level. When the dough 21 has thus risen to the desired volume, the dough-containing receptacle 10, which now functions as a baking pan, is placed in an oven and the dough is then baked under conventional conditions, as, for example, for about 25 minutes at 350°, such conditions being suitable for a one pound loaf, other weights or sizes probably requiring different baking times as will be evident to those skilled in the art.

In respect to the rising of the dough, and the consequent automatic unfolding of the receptacle, the following should be noted: Panels 15 have their end edges 15a inclined so that said end edges do not make contact with the fold lines d when the receptacle is closed, that is, when in the state shown in FIGURE 4. At this time, end edges 15a are inclined inwardly toward the contiguous free edges of closure panels 15. The reason for such inclination is to permit the dough to rise or expand, without risking such overlapping of such end edges 15a as might lock the panels 15 against the desired unfolding thereof.

Further, the rising dough also tends to overlap said contiguous free edges of closure panels 15. It is for this reason that aluminum foil top strips 12a are provided. In other words, the top strips 12a further insure against contact by the dough with a fibrous surface of panels 15 which might cause such cohesion as to interfere with proper unfolding of the panels 15.

It is also important that end top panels 19 be disposed outwardly of closure panels 15 in the closed condition of the receptacle 10. The reason for this is that uniform pressure is exerted against the inner surface of panels 15 by the rising dough, without any such diversion as might result from direct pressure upon panels 19 were they to be disposed inwardly of the closure panels 15.

It may further be noted that after baking is completed, the hooks 17a may be removed from cuts 18 to remove the baked loaf from the receptacle 10. At this time, the receptacle 10 may be re-hooked and re-formed if desired, so as to function as a cooling rack for the baked loaf. For this purpose, the hot, baked loaf may simply be deposited on the now empty receptacle which can thus serve as a cooling device.

There has been shown and described herein a preferred embodiment of this invention but it is obvious that numerous changes and omissions may be made therein without departing from its spirit.

What is claimed is:

1. A baking product preparation and storage article comprising a baking receptacle having a pair of top rectangular closure panels defined by outer fold lines and having longitudinally centered free edges which are contiguous and confront each other prior to opening of said receptacle, a frozen yeast-containing unraised, developed dough packaged in said receptcle when in closed position whereby thawing of said dough will cause it to rise and constantly press open said closure panels and thereby swing said closure panels on their said fold lines to a substantially vertical position, and a pair of opposite, folded top end panels on said baking receptacle, said end panels being defined by extreme end fold lines and having free edges respectively overlapping said closure panels on each end thereof in the closed condition of said receptacle so as to form with said closure panels a box-like structure whose panels are unfoldable to a baking pan condition.

2. A baking product preparation and storage article according to claim 1 and wherein said closure panels are of such a width, and said end panels are of such a length, as to have all their free edges at substantially the same vertical level when all said panels are unfolded to a substantially vertical position ready for baking of said dough in said receptacle.

3. A baking product preparation and storage article according to claim 1 and wherein said closure panels have their end edges inclined inwardly toward their said centered free edges so as to be accordingly spaced from the said fold lines of said end panels.

4. A baking product preparation and storage article according to claim 3 and including an aluminum film layer adhered to the entire inside surface of said receptacle, and further extending to the outside of said closure panels and forming elongated outer strips on said closure panels.

References Cited

UNITED STATES PATENTS

| | | | |
|---|---|---|---|
| 1,891,928 | 12/1932 | Hess | 99—172 |
| 2,732,995 | 1/1956 | Geisler et al. | 229—33 |
| 3,346,399 | 10/1967 | Watson et al. | 99—172 |
| 3,381,889 | 5/1968 | Laskow | 229—33 X |

TIM R. MILES, Primary Examiner

U.S. Cl. X.R.

229—33, 36